United States Patent
Tao et al.

(10) Patent No.: US 12,535,460 B2
(45) Date of Patent: Jan. 27, 2026

(54) SMALL MOLECULE DETECTION IN NORMAL IONIC STRENGTH BUFFERS

(71) Applicant: ARIZONA BOARD OF REGENTS ON BEHALF OF ARIZONA STATE UNIVERSITY, Scottsdale, AZ (US)

(72) Inventors: Nongjian Tao, Fountain Hills, AZ (US); Shaopeng Wang, Chandler, AZ (US); Runli Liang, Mesa, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 557 days.

(21) Appl. No.: 17/375,231

(22) Filed: Jul. 14, 2021

(65) Prior Publication Data
US 2022/0018808 A1 Jan. 20, 2022

Related U.S. Application Data

(60) Provisional application No. 63/051,667, filed on Jul. 14, 2020.

(51) Int. Cl.
*G01N 27/447* (2006.01)
*G01N 21/64* (2006.01)

(52) U.S. Cl.
CPC ... *G01N 27/44791* (2013.01); *G01N 21/6428* (2013.01); *G01N 21/6458* (2013.01);
(Continued)

(58) Field of Classification Search
CPC ......... G01N 27/44791; G01N 21/6428; G01N 21/6458; G01N 2021/6439;
(Continued)

(56) References Cited

U.S. PATENT DOCUMENTS 9,772,305 B2   9/2017 Tao
2003/0116437 A1* 6/2003 Burns ............... G01N 27/44791
                                                       204/453
(Continued)

OTHER PUBLICATIONS

Guan et al., Detection of molecular binding via charge-induced mechanical response of optical fibers, Chemical Sciences, 2014, 5, 4375-4381 (Year: 2014).*
(Continued)

*Primary Examiner* — James Lin
*Assistant Examiner* — Sommer Yousef Osman
(74) *Attorney, Agent, or Firm* — MH2 Technology Law Group, LLP

(57) ABSTRACT

A system for detecting target molecules includes a sample well defining a sensing region and two electrode regions, a sensor positioned in the sensing region and sensitized to the target molecules, an electrode positioned in each electrode region and configured to expose the sensor to a frequency-modulated electric field, and a detector configured to detect both an amplitude of oscillation of the sensor at a frequency of the modulated electric field and a direction of a displacement of the sensor. The sensing region defines a channel between the electrodes, and a ratio of a current density at a center of the sensing region to a current density at one of the electrodes is at least 2. The system allows detection of target molecules in a normal ionic strength buffer (e.g., having an ionic strength in a range of about 10 mM to about 1 M).

10 Claims, 15 Drawing Sheets

(52) U.S. Cl.
CPC ............... *G01N 2021/6439* (2013.01); *G01N 2201/088* (2013.01)

(58) Field of Classification Search
CPC ......... G01N 2201/088; G01N 21/8507; G01N 2021/6484; G01N 33/5302; G01N 2021/7769; G01N 21/1717; G01N 27/44756; G01N 2021/772; G01N 21/7703–7746; G01N 2021/7706–7736; G01N 2021/1719–1731
See application file for complete search history.

(56) References Cited

U.S. PATENT DOCUMENTS

| | | | |
|---|---|---|---|
| 2004/0005540 | A1 | 1/2004 | Petrenko et al. |
| 2007/0059763 | A1* | 3/2007 | Okano ................ G01N 33/566 435/7.1 |
| 2013/0059366 | A1* | 3/2013 | Pollack ............. B01L 3/502715 435/287.2 |
| 2014/0131204 | A1* | 5/2014 | Chou ..................... B03C 5/026 204/601 |
| 2015/0132766 | A1* | 5/2015 | Yasuda .............. G01N 15/1459 435/7.1 |
| 2018/0156752 | A1* | 6/2018 | Tao ........................ G01N 27/60 |
| 2018/0346975 | A1* | 12/2018 | Marczak .......... G01N 27/44721 |
| 2022/0018808 | A1 | 1/2022 | Wang et al. |

OTHER PUBLICATIONS

Yuen et al., Self-referencing a single waveguide grating sensor in a micron-sized deep flow chamber for label-free biomolecular binding assays, Lab on a Chip, 2005, 5, 959-965 (Year: 2005).*
Zhang et al., High-performance differential surface plasmon resonance sensor using quadrant cell photodetector, Rev. Sci. Instrum. , 2003, 74, 150-153 (Year: 2003).*
Schulte et al., Microfluidic technologies in clinical diagnostics, 2002, Clinica Chimica Acta, 231, pp. 1-10 (Year: 2002).*
Arkin et al., Small-Molecule Inhibitors of Protein-Protein Interactions: Progressing Towards the Dream, Nature Reviews, Drug Discovery, vol. 3, Apr. 2004, pp. 301-317.
Baksh et al., Label-free quantification of membrane-ligand interactions using backscattering interferometry, Nature Biotechnology, vol. 29, No. 4, Apr. 2011, pp. 357-362.
Bernetti et al., Kinetics of Drug Binding and Residence Time, Annual Review of Physical Chemistry, 70, 2019, pp. 143-171.
Biaku et al., A semiempirical study of the temperature dependence of the anode charge transfer coefficient of a 6 kW PEM electrolyzer, International Journal of Hydrogen Energy, 33, 2008, pp. 4247-4254.
Borch et al., Nanodiscs for Immobilization of Lipid Bilayers and Membrane Receptors: Kinetic Analysis of Cholera Toxin Binding to a Glycolipid Receptor, Analytical Chemistry, vol. 80, No. 16, Aug. 15, 2008, pp. 6245-6252.
Bornhop et al., Free-Solution, Label-Free Molecular Interactions Studied by Back-Scattering Interferometry, Science, vol. 317, Sep. 21, 2007, pp. 1732-1736.
Bravman et al., Exploring "one-shot" kinetics and small molecule analysis using the ProteOn XPR36 array biosensor, Analytical Biochemistry ,358, 2006, pp. 281-288.
Cho et al., Quartz crystal microbalance with dissipation monitoring of supported lipid bilayers on various substrates, Nature Protocols, vol. 5, No. 6, 2010, pp. 1096-1106.
Cooper, Label-free screening of bio-molecular interactions, Anal Bioanal Chem, 377, 2003, pp. 834-842.
Copeland, The drug-target residence time model: a 10-year retrospective, Nature Reviews, Drug Discovery, vol. 15, Feb. 2016, pp. 87-95.
Costet et al., PCSK9 and LDL cholesterol: unravelling the target to design the bullet, Trends in Biochemical Sciences, vol. 33, No. 9, pp. 426-434.

Denisov et al., Directed Self-Assembly of Monodisperse Phospholipid Bilayer Nanodiscs with Controlled Size, J. Am. Chem. Soc., 126, 2004, pp. 3477-3487.
Domenech-Carbo et al., Electrochemical analysis of the alterations in copper pigments using charge transfer coefficient/peak potentional diagrams. Application to microsamples of baroque wall paintings attached to polymer film electrodes, Fresenius J Anal Chem, 369, 2001, pp. 576-581.
Foley et al., Surface Impedance Imaging Technique, Anal. Chem. 80, 2008, pp. 5146-5151.
Fry, Protein-Protein Interactions as Targets for Small Molecule Drug Discovery, Biopolymers (Peptide Science), vol. 84, 2006, pp. 535-552.
Guan et al., Rapid scan Fourier transform detection of a frequency encoded quartz crystal microbalance array, Review of Scientific Instruments, 74, 2003, pp. 5241-5248.
Henstridge, Off-Target Cannabinoid Effects Mediated by GPR55, Pharmacology, 89, 2012, pp. 179-187.
Heym et al., Label-free detection of small-molecule binding to a GPCR in the membrane environment, Biochimica et Biophysica Acta 1854, 2015, pp. 979-986.
Homola et al., Surface plasmon resonance sensors: review, Sensors and Actuators B 54, 1999, pp. 3-15.
Horton et al., PCSK9: a convertase that coordinates LDL catabolismournal of Lipid Research, April Supplement, 2009, pp. S172-S177.
Inglese et al., High-throughput screening assays for the identification of chemical probes, Nature Chemical Biology, vol. 3, No. 8, Aug. 2007, pp. 466-479.
Isin et al., Identifying Ligand Binding Conformations of the b2-Adrenergic Receptor by Using Its Agonists as Computational Probes, PLOS ONE, vol. 7, Issue 12, Dec. 2012, e50189, 8 pages.
Jepsen et al., Evaluation of back scatter interferometry, a method for detecting protein binding in solution, The Royal Society of Chemistry, Analyst, 140, 2015, pp. 895-901.
Kozma et al., Integrated planar optical waveguide interferometer biosensors: A comparative review, Biosensors and Bioelectronics 58, 2014, pp. 287-307.
Kunkel, Rapid and efficient site-specific mutagenesis without phenotypic selection, Proc. Natl. Acad. Sci. USA, vol. 82, Jan. 1985, pp. 488-492.
Lasonder et al., A fast and sensitive method for the evaluation of binding of phage clones selected from a surface displayed library, Nucleic Acids Research, vol. 22, No. 3, 1994, pp. 545-546.
Liang et al., Aggregated Silver Nanoparticles Based Surface-Enhanced Raman Scattering Enzyme-Linked Immunosorbent Assay for Ultrasensitive Detection of Protein Biomarkers and Small Molecules, Analytical Chemistry, 87, 2015, pp. 5790-5796.
Liang et al., Charge-Sensitive Optical Detection of Small Molecule Binding Kinetics in Normal Ionic Strength Buffer, ACS Sensors, 6, 2021, pp. 364-370.
Liang et al., Charge-Sensitive Optical Detection of Binding Kinetics between Phage-Displayed Peptide Ligands and Protein Targets, Biosensors, 12, 394, 2022, 10 pages.
Liang, Label-Free Detection of Molecular Interactions, A Dissertation Presented in Partial Fulfillment of the Requirements for the Degree Doctor of Philosophy, Arizona State University, 2021, 132 pages.
Lunder et al., Affinity Ranking of Phage-Displayed Peptides: Enzyme-Linked Immunosorbent Assay versus Surface Plasmon Resonance, Acta Chim. Slov., 55, 2008, pp. 233-235.
Ma et al., Study of Small-Molecule-Membrane Protein Binding Kinetics with Nanodisc and Charge-Sensitive Optical Detection, Analytical Chemistry, 88, 2016, pp. 2375.2379.
Ma et al., Measuring Ligand Binding Kinetics to Membrane Proteins Using Virion Nano-oscillators, Journal of the American Chemical Society, 140, 2018, pp. 11495-11501.
Ma et al., Quantifying Ligand-Protein Binding Kinetics with Self-Assembled Nano-oscillators, Analytical Chemicstry, 91, 2019, pp. 14149-14156.
Minic et al., Immobilization of native membrane-bound rhodopsin on biosensor surfaces, Biochimica et Biophysica Acta, 1724, 2005, pp. 324-332.

(56) References Cited

OTHER PUBLICATIONS

Okada-Iwabu et al., A small-molecule AdipoR agonist for type 2 diabetes and short life in obesity, Nature, vol. 503, 493, Nov. 28, 2013, pages.
Overington et al., How many drug targets are there?, Nature Reviews, Drug Discovery, vol. 5, Dec. 2006, pp. 993-996.
Papaneophytou et al., Quantification of the Effects of Ionic Strength, Viscosity, and Hydrophobicity on Protein-Ligand Binding Affinity, ACS Medical Chemistry Letters, 5, 2014, pp. 931-936.
Paseka, Influence of hydrogen absorption in amorphous Ni—P electrodes on double layer capacitance and charge transfer coefficient of hydrogen evolution reaction, Electrochimica Acta 44, 1999, pp. 4551-4558.
Popot, Amphipols, Nanodiscs, and Fluorinated Surfactants: Three Nonconventional Approaches to Studying Membrane Proteins in Aqueous Solutions, Annu. Rev. Biochem. 79, 2010, pp. 737-775.
Qi et al., Selective inhibition of Ezh2 by a small molecule inhibitor blocks tumor cells proliferation, PNAS, vol. 109, No. 52, Dec. 26, 2012, 21360-21365.
Quang et al., How to measure the affinity of aptamers for membrane proteins expressed on the surface of living adherent cells, Methods, 97, 2016, pp. 35-43.
Reisinger et al. Exploiting Protein Symmetry to Design Light-Controllable Enzyme Inhibitors, Angew. Chem. Int. Ed., 53, 2014, pp. 595-598.
Shabani et al., Bacteriophage-Modified Microarrays for the Direct Impedimetric Detection of Bacteria, Anal., Chem. 80, 2008, pp. 9475-9482.
Shan et al., A label-free optical detection method for biosensors and microfluidics, Applied Physics Letters, 92, 133901, Apr. 4, 2008, 4 pages.
Shan et al., Detection of Charges and Molecules with Self-Assembled Nano Oscillators, NANO Letters, 14, 2014, pp. 4151-4157.
Sharma et al., Enzyme-Linked Small-Molecule Detection Using Split Aptamer Ligation, Analytical Chemistry, 84, 2012, pp. 6104-6109.
Sharpe et al., Regulation of the oncoprotein Smoothened by small molecules, Nature Chemical Biology, vol. 11, Apr. 2015, pp. 246-255.
Sheehan et al., Phage and Yeast Display, Microbiology Spectrum, American Society for Microbiology Press, 17 pages.
Shi et al., Influence of pH and Ionic Strength on the Steric Mass-Action Model Parameters around the Isoelectric Point of Protein, Biotechnol. Prog. 21, 2005, pp. 516-523.
Short et al., Concentration Overpotentials on Antimony Electrodes in Differential Electrolytic Potentiometry, Analytical Chemistry, vol. 37, No. 8, Jul. 1965, pp. 962-967.
Syu et al., Development and application of a high-content virion display human GPCR array, Nature Communications, 10:1997, 2019, 12 pages.
Tijani et al., Investigation of the effect of charge transfer coefficient (CTC) on the operating voltage of polymer electrolyte membrane (PEM) electrolyzer, International Journal of Hydrogen Energy, 43, 2018, pp. 9119-9132.
Tlili et al., Bacteria Screening, Viability, And Confirmation Assays Using Bacteriophage-Impedimetric/Loop-Mediated Isothermal Amplification Dual-Response Biosensors, Analytical Chemistry, 85, 2013, pp. 4893-4901.
Tolba et al., A bacteriophage endolysin-based electrochemical impedance biosensor for the rapid detection of Listeria cells, Analyst, 137, 2012, 5749-5756.
Vlieghe et al., Synthetic therapeutic peptides: science and market, Drug Discovery Today, vol. 15, Nos. 1/2, Jan. 2010, pp. 40-56.
Wang et al., Evaluating interaction forces between BSA and rabbit anti-BSA in sulphathiazole sodium, tylosin and levofloxacin solution by AFM, Nanoscale Research Letters, 6:579, 2011, 9 pages.
Wartchow et al., Biosensor-based small molecule fragment screening with biolayer interferometry, J Compt Aided Mol Des, 25, 2011, pp. 669-676.
Wienken et al., Protein-binding assays in biological liquids using microscale thermophoresis, Nature Communications, published Oct. 19, 2010, 7 pages.
Wu et al., Remote control of therapeutic T cells through a small molecule-gated chimeric receptor, Science, vol. 350, Issue 6258, Oct. 16, 2015, 293, pp. aab4077-1-aab4077-10.
Zhang et al., Identification of a Small Peptide That Inhibits PCSK9 Protein Binding to the Low Density Lipoprotein Receptor, The Journal of Biological Chemistry, vol. 289, No. 2, Jan. 10, 2014, pp. 942-955.
Zhang et al., Discovery of a cryptic peptide-binding site on PCSK9 and design of antagonists, Nature Structure and Molecular Biology, vol. 24, No. 10, Oct. 2017, 15 pages.
Zhang et al., Just how prevalent are peptide therapeutic products? A critical review, International Journal of Pharmaceutics, 587, 119491, 2020, 19 pages.
Zheng et al., Analysis of biomolecular interactions using affinity microcolumns: A review, Journal of Chromatography B, 968, 2014, pp. 49-63.
Zimmermann et al., Small molecule inhibition of the KRAS-PDEδ interaction impairs oncogenic KRAS signalling, Nature, vol. 497, May 30, 2013, pp. 638-642.

\* cited by examiner

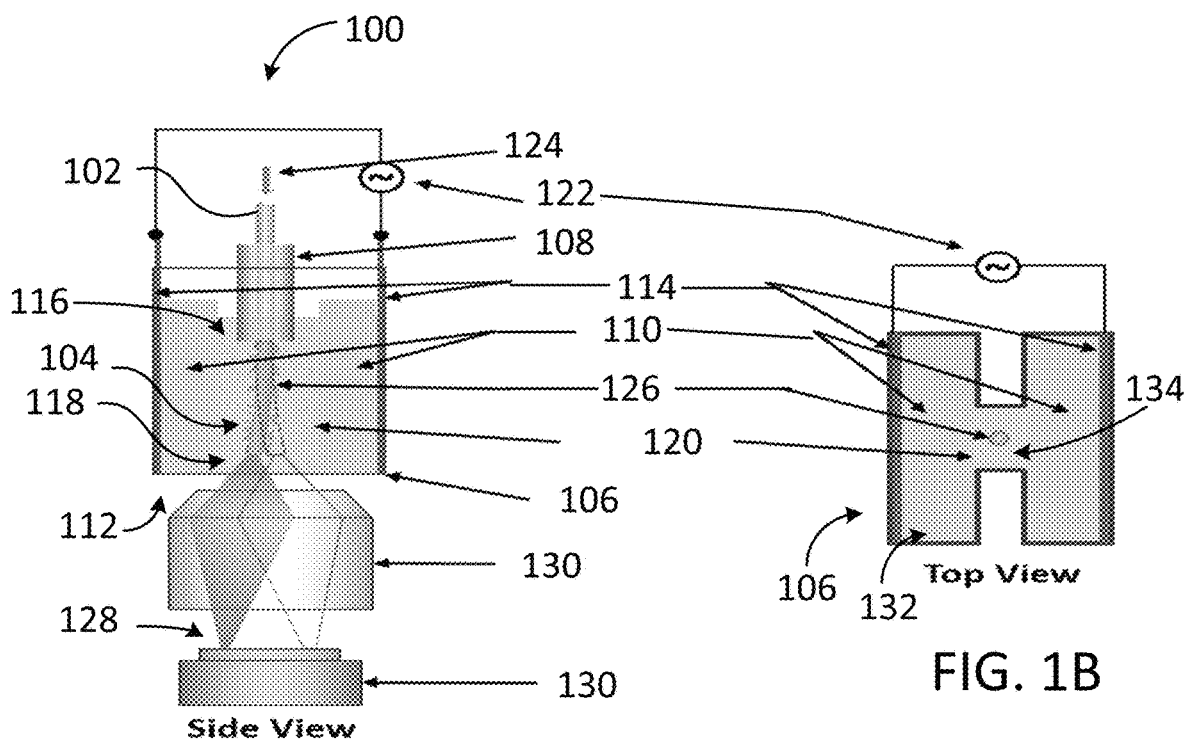
FIG. 1A
FIG. 1B
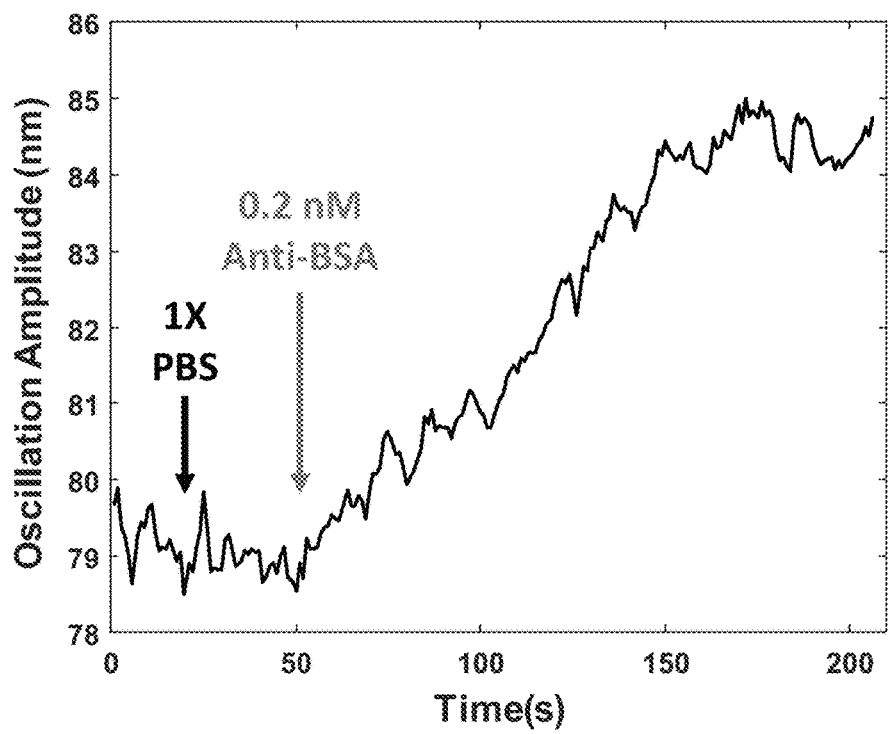
FIG. 5

Tocrifluor
(MW = 975 Da)

B2 antagonist
(MW = 834 Da)

SMALL MOLECULE DETECTION IN NORMAL IONIC STRENGTH BUFFERS

CROSS-REFERENCE TO RELATED APPLICATION

This application claims the benefit of U.S. Application No. 63/051,667 entitled "SMALL MOLECULE DETECTION IN NORMAL IONIC STRENGTH BUFFERS" and filed on Jul. 14, 2020, which is incorporated by reference herein in its entirety.

STATEMENT OF GOVERNMENT SUPPORT

This invention was made with government support under R33 CA202834 awarded by the National Institutes of Health. The government has certain rights in the invention.

TECHNICAL FIELD

This invention relates to systems and methods for label-free small molecule detection in normal ionic strength buffers.

BACKGROUND

Measuring molecular binding kinetics is critical to the understanding of many biological processes, including intercellular communication, enzymatic, and metabolic activities, and to the discovery and validation of drugs. To date, various detection techniques have been developed to determine the binding kinetics, which are divided into two categories: labeled and label-free detection techniques. Label-free methods for kinetic binding analysis are preferred over labeled methods, such as enzyme-linked immunosorbent assay (ELISA) and microscale thermophoresis (MST), because direct detection of a molecular binding process reduces secondary effects and complexity and produces real-time binding kinetics. For these reasons, many label-free methods have been developed, include surface plasmon resonance (SPR), biolayer interferometry (BLI), backscattering interferometry (BSI), waveguide interferometry, quartz crystal microbalance (QCM), and surface acoustic wave (SAW) sensors.

The signal of these label-free methods scales with the mass of ligands bound to the sensor surface. As such, quantifying the kinetics of small molecule ligand binding with large protein receptors is still challenging due at least in part to the large mass ratio between the ligands and receptors. Small molecules represent ~90% of approved drugs, and over 60% of small molecule drug targets are membrane protein receptors. Purified membrane proteins are typically stabilized in an amphiphilic environment to remain functional, using technologies such as nanodiscs that forms nanoscale patches of phospholipids surrounding the membrane proteins, and virion display technology (VirD) that expresses membrane proteins on the lipid envelope of virions. These complex assemblies are larger than membrane proteins alone, so dense packing on the sensor surface is difficult to achieve, and sensitivity is correspondingly reduced. Thus, detection of small molecule ligands is a challenge for existing mass sensitive technologies.

SUMMARY

Charge sensitive optical detection (CSOD) systems and methods are disclosed for detection of the charge of a molecule with an optical fiber. In particular, a technique capable of detecting molecular binding kinetics in normal ionic strength buffers (e.g., having an ionic strength of about 10 mM to about 1 M) is disclosed. An H-shaped sample well is used to increase the current density at the sensing area to compensate the signal loss due to ionic screening at normal ionic strength buffer, while keeping the current density low at the electrodes to minimize the electrode reaction. In addition, agarose gels are used to cover the electrodes to prevent electrode reaction generated bubbles from entering the sensing area. The binding kinetics between G-protein-coupled receptors (GPCRs) and their small molecule ligands in normal buffer are assessed. Affinities measured in normal ionic strength buffers facilitate unbiased binding kinetic quantification.

In a first general aspect, a system for detecting target molecules includes a sample well defining a sensing region and two electrode regions, a sensor positioned in the sensing region and sensitized to the target molecules, an electrode positioned in each electrode region and configured to expose the sensor to a frequency-modulated electric field, and a detector configured to detect both an amplitude of oscillation of the sensor at a frequency of the modulated electric field and a direction of a displacement of the sensor. The sensing region defines a channel between the electrodes, and a ratio of a current density at a center of the sensing region to a current density at one of the electrodes is at least 2. The system allows detection of target molecules in a normal ionic strength buffer (e.g., having an ionic strength in a range of about 10 mM to about 1 M).

Implementations of the first general aspect may include one or more of the following features.

The ratio of the current density at the center at the sensing region to the maximum current density at one of the electrodes can be at least 2 and up to 20 or 50.

In some examples, a cross section of the sample well perpendicular to a longitudinal axis of the optical fiber has an "H" shape. In other examples, a cross section of the sample well perpendicular to a longitudinal axis of the optical fiber has a cutaway circular shape.

An electrophoresis gel may be positioned in the sample well between each electrode and the sensing region. An opening in the electrophoresis gel defines the sensing region, which is configured to contain a solution comprising the target molecule.

The sensor may be a filament, such as an optical fiber (e.g., a glass optical fiber). The optical fiber can be configured (e.g., functionalized) to interact with an amine group (e.g., a primary amine group on a protein or virion), a carboxy group (e.g., on a protein), or a streptavidin or biotinylated molecule. The optical fiber can be functionalized with a silane compound (e.g., an epoxy such as (3-glycidyloxypropyl)trimethoxysilane).

The target molecules are electrically charged. Examples of target molecules include proteins and virions.

The detector is an optical imager or a photodetector (e.g., a position sensitive photodetector).

In a second general aspect, analyzing a solution to assess the presence of an electrically charged molecule in a sample includes providing the sample to a sensing region of a sample well, contacting the sample with a sensor comprising molecular receptors configured to interact with the electrically charged molecule, applying an alternating electric field perpendicular to a longitudinal axis of the optical fiber, and assessing an amplitude of the oscillation of the optical fiber. The sample includes a buffer having an ionic strength in a range between about 10 mM and about 1M. Based at least in part on the amplitude of the oscillation of the optical fiber, the presence of the electrically charged molecule is assessed.

Implementations of the second general aspect may include one or more of the following features.

The sensing region typically forms a channel between electrodes configured for applying the alternating electric field. A signal-to-noise ratio of the amplitude of the oscillation is at least 80. Some implementations of the second general aspect further include binding the electrically charged molecules to the sensor. Binding the electrically charged molecules to the sensor can result in an increase in mass of the sensor of less than 0.5%.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIG. 1A is a side cutaway view of a charge sensitive optical detection (CSOD) system. FIG. 1B is a top view of a sample well depicted in FIG. 1A.

FIG. 2A corresponds to a well of a standard 96 well plate. FIG. 2B corresponds to an H-shaped well. FIGS. 2C and 2D shows the current density plotted along dashed lines in FIGS. 2A and 2B, respectively.

FIG. 5 shows anti-BSA binding onto a BSA-modified fiber surface.

DETAILED DESCRIPTION

Figure 2A:
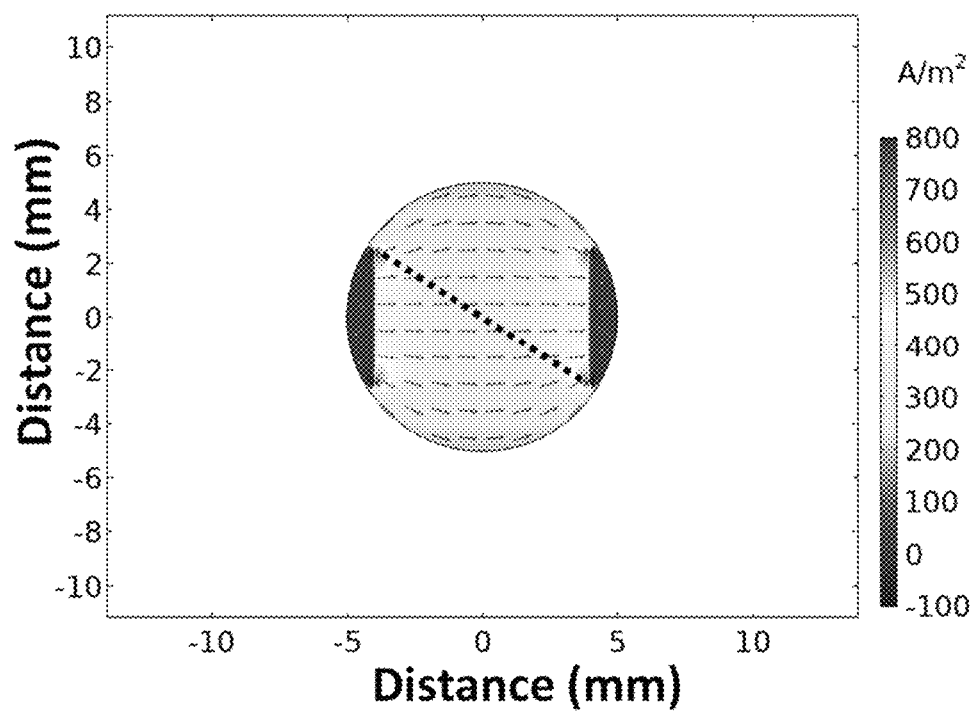
FIGS. 2A-2D show simulation of current density distribution in two different well designs.

FIG. 1A is a side cutaway view of a charge sensitive optical detection (CSOD) system 100. A sensor (e.g., a filament or optical fiber) 102 functionalized with molecular receptors 104 is positioned in a sample well 106. The optical fiber 102 is typically a glass optical fiber. The optical fiber 102 may be stabilized, for example, with tube 108. Sample well 106 includes electrophoresis gel 110 between electrode regions 112 including electrodes 114. Sensing region 116 is defined by an opening in the electrophoresis gel 110. Optical fiber 102 is positioned in sensing region 116 such that molecular receptors 104 on the optical fiber are positioned in sensing region 116, which is configured to contain liquid sample 118. Liquid sample 118 includes a normal ionic strength buffer. If a target molecule (e.g., analyte) 120 in the liquid sample 118 contains electrically charged molecular ligands, binding of the ligands to the receptors 104 changes the surface charge of the optical fiber 102. In some cases, molecular receptors 104 can be selected to interact with primary amine groups in the target molecules (e.g., proteins or virions).

As used herein, a "normal ionic strength buffer" generally refers to a buffer having an ionic strength in a range of about 10 mM to about 1 M. Examples of normal ionic strength buffers include phosphate buffered saline (PBS) with a total ionic strength of about 150 mM, saline-sodium citrate (SSC) with a total ionic strength of about 165 mM, tris-acetate-ethylenediaminetetraacetic acid (TAE) with a total ionic strength of about 42 mM, tris-ethylendiaminetetracetic acid (TE) with a total ionic strength of about 11 mM.

To monitor the change in charge, an alternating electric field from source 122 is applied perpendicular to the optical fiber 102 and drives the optical fiber to oscillate. The oscillation amplitude is proportional to the surface charge of the optical fiber 102. The electrodes 114 are configured to expose the sensor to the frequency-modulated electric field. Thus, CSOD can be used to precisely measure the oscillation amplitude.

To measure the oscillation amplitude, light 124 is coupled into the optical fiber 102, and the oscillation of the fiber tip 126 is tracked from the optical image 128 of the fiber tip, together with a differential optical position tracking algorithm. The optical image 128 of the tip can be magnified (e.g., with an objective 130) and captured with a detector 130. Detector 130 may be an optical imager or a position sensitive photodetector.

FIG. 1B depicts a top view of sample well 106. As depicted, sample well 106 has an "H-shaped" cross-sectional perpendicular to a longitudinal axis of optical fiber 102, with larger wells 132 in fluid communication with sensing region 116 (i.e., central channel 134). Central channel 134 is configured to contain the liquid sample 118, and optical fiber 102 is configured to be positioned in the central channel. Thus, the sensing region 116 defines a channel between the electrodes 114. In this sample well configuration as well as others (e.g., a cross section of the sample well perpendicular to a longitudinal axis of the optical fiber has a cutaway circular shape), a ratio of a current density at a center of the sensing region 116 to the maximum current density at one of the electrodes 114 is at least 2, and up to 20 or up to 50.

U.S. Pat. Nos. 9,772,305 and 10,539,530, which are incorporated herein by reference, disclose systems and methods for small molecule detection.

Binding events with CSOD are detected based at least in part on a change in the charge upon binding. Biologically significant molecules are typically charged or partially charged. For example, over 90% of FDA approved small molecule drugs are charged. However, in some buffers, the effective charge of a molecule is significantly reduced due to ionic screening, which makes it difficult to apply CSOD to cases where biologically relevant buffers are needed. In principle, the oscillation amplitude could be increased by increasing the applied electric field. This requires a large current density at the location of the optical fiber tip, as the electric field, E, is related to current density, J, and the solution conductivity σ by:

$$J = \sigma \cdot E \tag{1}$$

The current density is determined by the total current, I, at the electrodes, and the cross-sectional area of the well at the location of the fiber tip. The current is determined by electrochemical reactions on the electrodes, which can be increased by applying a large potential difference between the electrodes. This strategy, however, can lead to larger electrochemical reactions, which can produce gas bubbles; the associated reaction products could interfere with the molecular binding processes on the fiber surface. This difficulty can be overcome using an H-geometry sample well, such as that depicted in FIG. 1B, with wells 132 in fluid communication with central channel 134. An electrode 114 with a large surface area is positioned in each of wells 132, and the optical fiber tip 126 is positioned in the central channel 134. Because the two electrodes 114 have large surface areas, the current densities on the electrode area are minimized for a given current. This allows minimization of the overpotential (η) according to the Tafel equation:

$$i = nFkCe^{\pm\alpha F \frac{\eta}{RT}} \tag{2}$$

where n is number of electrons being transferred, F is the Faraday constant, R is the universal gas constant, T is temperature, C is the reactive species concentration on the electrode surface, k is the rate constant for the electrode equation, and a is the charge transfer coefficient. The electric field, E, at the location of the tip in the central channel is:

$$E_{tip} = E_{electrodes} \cdot \frac{A_{electrodes}}{A_{tip}} \tag{3}$$

where A is the cross-sectional area of the solution in the sample well. $A_{electrodes}$ is the area at the electrode while $A_{tip}$ is the area at fiber tip.

Figure 2B:
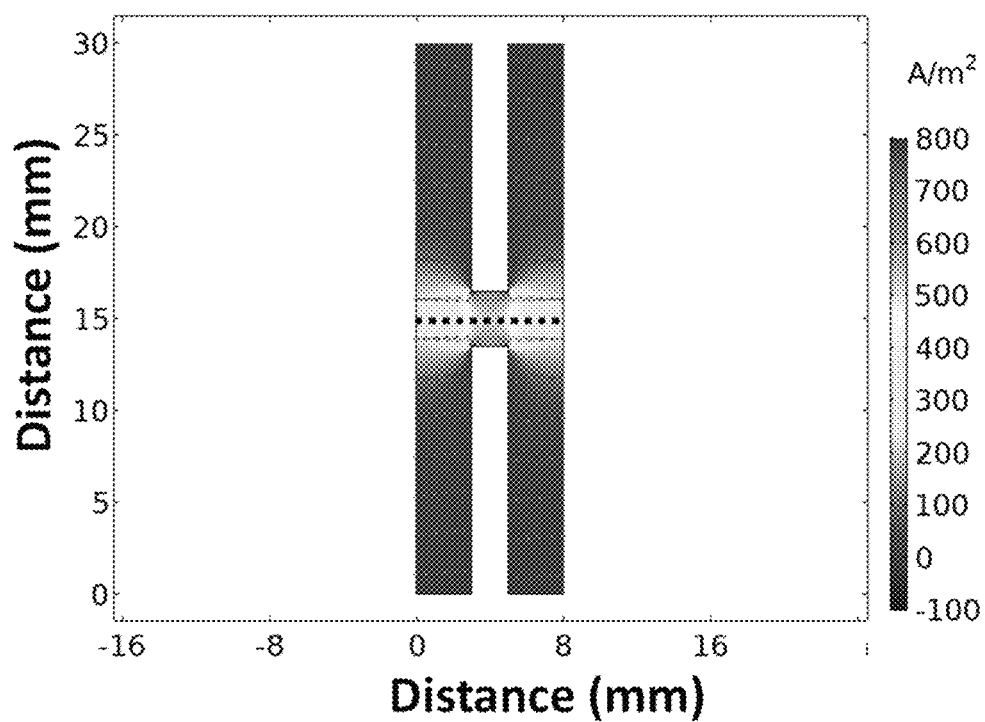
Figure 2C:
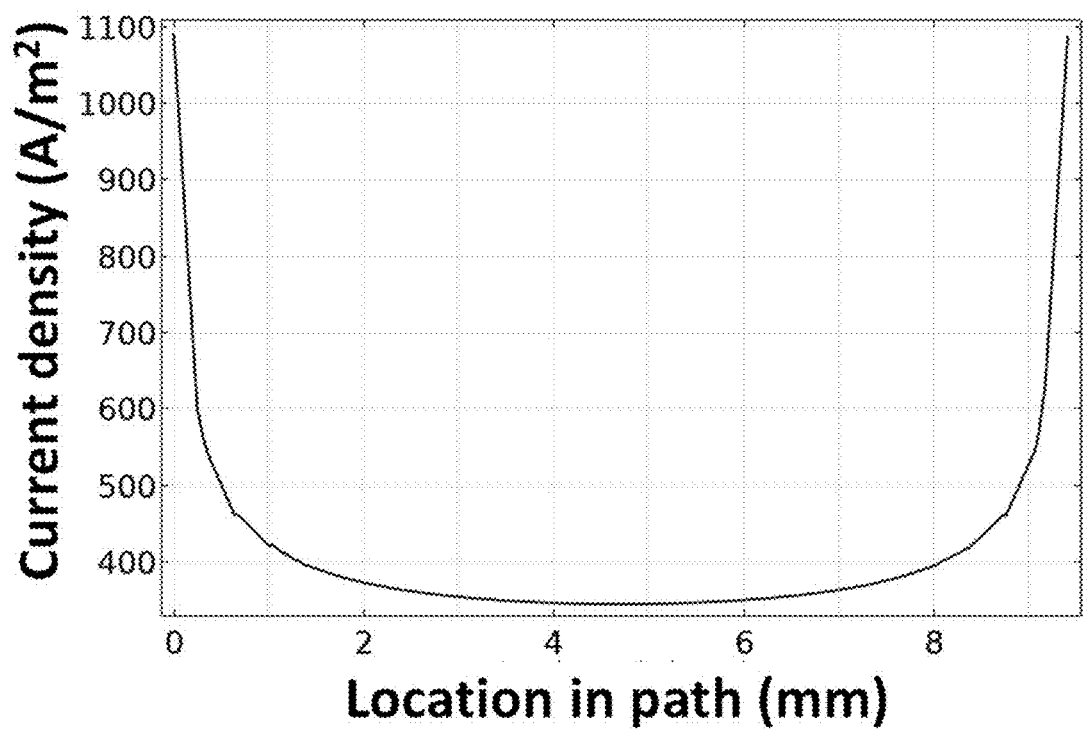
Figure 2D:
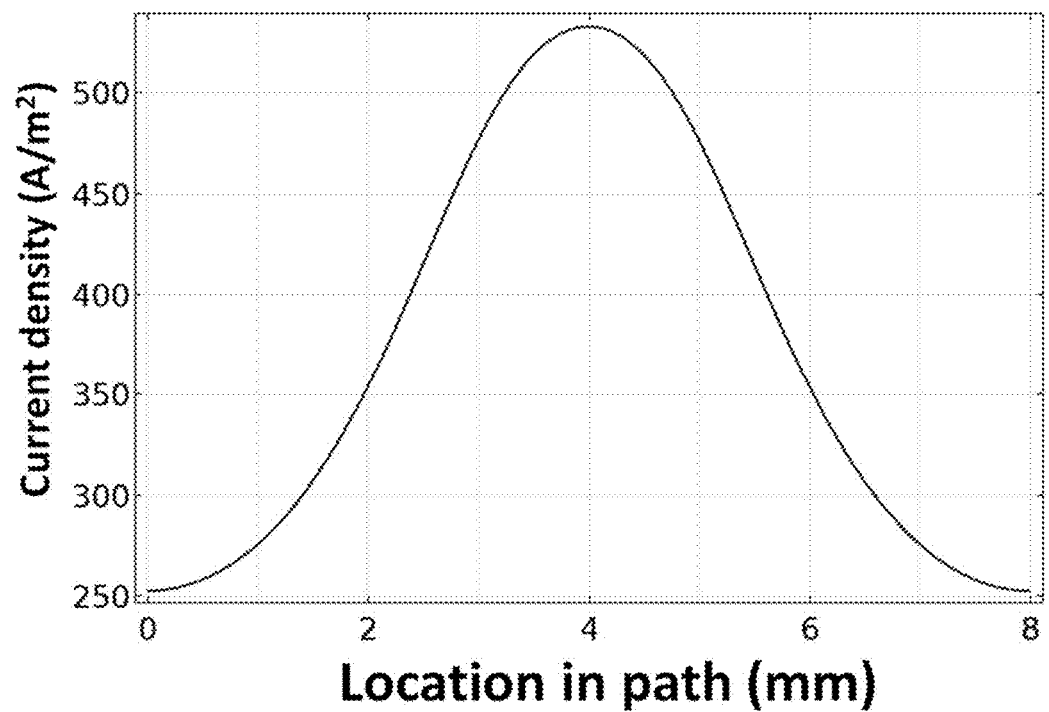

COMSOL simulations of the current density distribution in two different well designs are shown in FIGS. 2A-2D, with a voltage of 2V and a 1× phosphate buffered saline (PBS) buffer solution. FIG. 2A shows current density distribution in a well of a standard 96 well plate. FIG. 2B shows current density in an H-shaped well. The arrows indicate the direction of current density. FIG. 2C shows current density plotted along the dashed line in FIG. 2A, where the central sensing area has a current density of 350 A/m² and the highest current density on electrode is 1100 A/m², a ratio of ~0.3. FIG. 2D shows current density plotted along the dashed line in FIG. 2B where the central sensing area has a current density of 530 A/m² and the highest current density on the electrode is 250 A/m², a ratio of over 2. Therefore, the H-shaped design shows 6 times increase in the current density ratio between the sensing area and the electrode area.

Under the same electrical field applied, in a well of a traditional 96 well plate set up with two flat electrodes, the current density at the central sensing area is only about one third of the maximum current density on the electrode area. In the contrary, the H-shaped well nearly doubled the current density at the central sensing area, while the maximum current density on the electrodes was cut to less than half of the sensing area. Therefore, the H-shaped well has a 6 times improvement of the current density ratio between the sensing area and electrodes. Thus, the electrical field can be further increased while avoiding excess electrochemical reactions at the electrodes.

To further minimize the side effects of large current density, two pieces of agarose electrophoresis gels are placed in front of two electrodes separately. The electrophoresis gels help by preventing the bubbles generated from electrode reactions from entering the sensing area while maintaining the solution conductivity, and by reducing the liquid surface area, providing a more stable liquid surface with less evaporation and fluctuation. In the center of the H-shaped sample well, a narrow (2 mm by 2 mm) tunnel filled with solution connects the gels and electrodes, providing a higher current density in the center area where the optical fiber is placed. Therefore, the current density was increased to 10 times higher by increasing the electrical field. While facilitating faster chemical reactions at the electrodes and producing some gas bubbles, the noise of CSOD measurement is not increased due at least in part to the physical blocking provided by electrophoresis gels.

Figure 3:
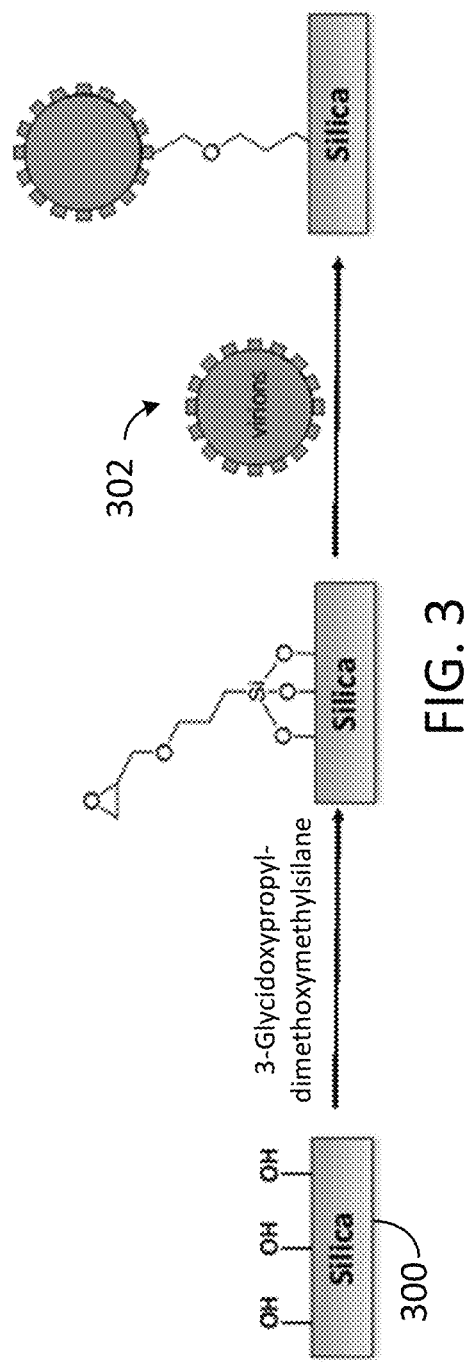
FIG. 3 depicts surface functionalization of a CSOD optical fiber.

Analyzing a solution to assess the presence of an electrically charged molecule in a sample includes providing the sample to a sensing region of a sample well. In some cases, the sensing region forms a channel between electrodes configured for applying the alternating field. The sample includes a normal ionic strength buffer. The sample is contacted with a sensor (e.g., optical fiber) including molecular receptors configured to interact with the electrically charged molecule. In some examples, the glass fiber tips are functionalized with a binder configured to bind the target molecule (e.g., a protein or virion), and the electrically charged molecules are bound to the optical fiber. Examples of suitable binders include glass surface chemistry for biomolecular conjugation, such as certain silanes (e.g., 3-glycidoxypropyldimethoxy-methylsilane (epoxy)), that can conjugate to the primary amine groups on target molecules, including proteins and virions, biotin-PEG-silane that can conjugate with streptavidin or biotinylated molecules, and amine-PEG-silane that can conjugate with a —COOH group of a protein) Surface functionalization steps are depicted in FIG. 3, which shows a substrate 300 (e.g., a silica substrate), a binder 302 (e.g., a silane) bound to the substrate, and subsequent binding of a target molecule (e.g., analyte) 302 to the binder. Binding the electrically charged molecules to the sensor can result in an increase in the mass of the sensor of less than 0.5%.

An alternating electric field is applied perpendicular to a longitudinal axis of the optical fiber. An amplitude of the oscillation of the optical fiber is assessed. In some cases, the signal-to-noise ratio of the amplitude of the oscillation is at least 80. Based at least in part on the amplitude of the oscillation of the optical fiber, the presence (or absence) of the electrically charged molecule is assessed.

EXAMPLES

Multimode optical fibers (125 μm in diameter) were purchased from Thorlabs, Inc. Phosphate-buffered saline (PBS) was purchased from Mediatech Inc. GPR55 and ADRB2 HSV-1 virions were engineered using VirD technology and provided by Prof. Heng Zhu and Prof. Desai at Johns Hopkins University. B2 antagonist (CA200693) was purchased from Hellobio; Tocrifluor was purchased from Tocris. Deionized (DI) water with a resistivity of 18.2 MΩ·cm$^{-1}$ filtered through a 0.45 μm filter was used in all experiments. Other chemicals were purchased from Sigma-Aldrich.

An inverted microscope (Olympus IX-70 with 40× objective) with a CCD camera (Pike F-032, Allied Vision) was used for recording 14-bit grayscale image sequences at a frame rate of 106.5. A customized plate with 2 PDMS wells shown in FIGS. 1A and 1B was mounted on a motorized microscope stage (MAC 6000 modular automation controller, Ludl Electronic Products LTD.). Two steel electrodes (1 cm×3 cm) were placed 1 cm apart inside the well, then blocked with agarose electrophoresis gel. A green LED (505 nm, 400 mW, Thorlabs M505L3) light was coupled into the fiber via a focusing lens. Fiber is dipped into analyte solution between the electrophoresis gels. To control the fiber and move the fiber between the 2 wells, the fiber was clamped to a motorized arm (A-LSQ075B, Zaber). A sinusoidal potential was applied with a function generator (33521A, Agilent). A USB data acquisition card (USB-6229, National Instruments) was used to record voltage and current.

The tip (about 1 cm) of an optical fiber thread (about 20 cm) was first soaked in acetone for 1 minute and then rinsed with DI water and dried. The polymer coating layer on the optical fiber was then stripped off with an optical fiber stripper. The bare fiber was etched by soaking it in 47% hydrofluoric acid for 29 minutes and 15 seconds for a diameter of approximately 15 μm. The etched fiber was later rinsed with DI water to wash off the hydrofluoric acid and then blown dry with nitrogen. The tip was cut to about 9 mm long. Before functionalization, the optical fiber was cleaned with oxygen plasma for 3 minutes.

The etched fiber was soaked in (3-glycidyloxypropyl) trimethoxysilane (epoxy) solution (2.5% volume percentage of epoxy in isopropanol) for 1 hour for surface functionalization. The fiber was then rinsed with PBS buffer. For BSA-antiBSA binding experiments, the epoxy modified fiber was soaked in 20 μg/mL BSA solution (in 1×PBS) for 1 hour. For VirD ligand binding experiment, the epoxy modified fiber was soaked in VirD sample solution (10⁷ virions in 1×PBS) for 1 hour.

Fluorescence imaging of the CSOD fiber tip was recorded with a microscope (Olympus IX-81) with a mercury lamp. The excitation and emission wavelengths were 543 nm and 590 nm for Tocrifluor, and 633 and 650 nm for B2 antagonist, respectively.

Figure 4A:
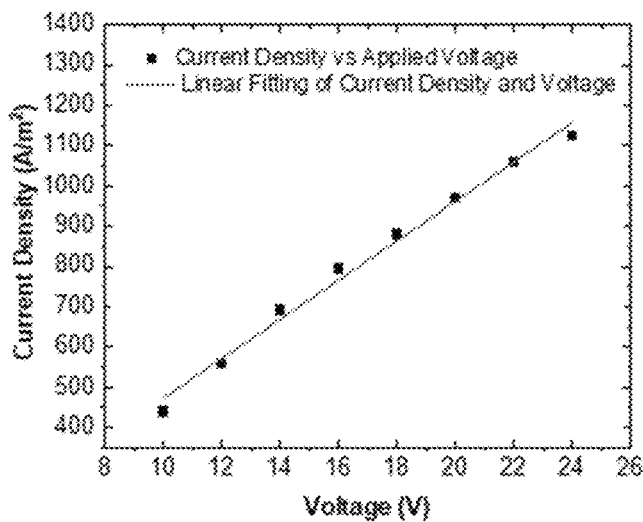
FIG. 4A shows current density versus applied electrical field voltage.
Figure 4B:
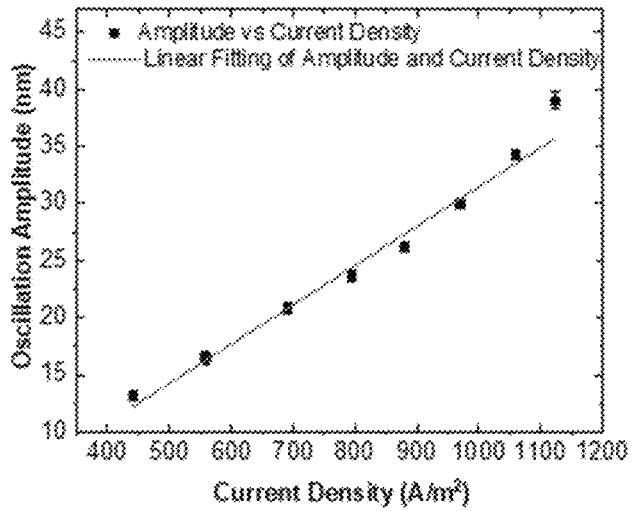
FIG. 4B shows fiber oscillation amplitude versus current density.
Figure 4C:
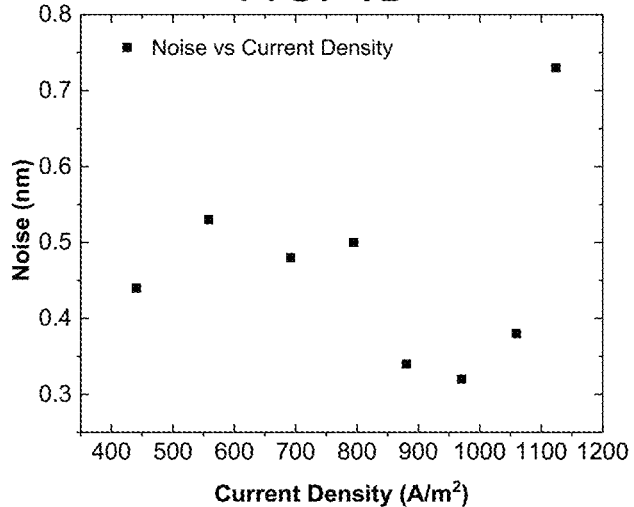
FIG. 4C shows noise level in amplitude versus current density.

To select the correct voltage range in 1×PBS, etched fiber was dipped into 1×PBS solution and the vibration amplitude is measured against different current densities corresponding to different voltages. FIG. 4A shows that current density is linearly proportional to the applied voltage. FIG. 4B shows that the oscillation amplitude is linearly proportional to the current density. FIG. 4C shows that the noise level is relatively stable but starts to increase at very high current density, which is likely caused by bubble-generated mechanical noises due to the excess reactions at the electrodes. To achieve maximum signal to noise ratio, the current density was controlled at around 1000 A/m$^2$, corresponding to voltage at 20V.

To demonstrate the detection of large molecules, the fiber surface was modified with bovine serum albumin (BSA) and the binding kinetics of BSA antibody (anti-BSA) to BSA was assessed. Results are discussed with respect to FIGS. 5A-5H. BSA modified fiber tip was initially dipped into a well containing 1×PBS, its oscillation amplitude was recorded over time as baseline test, then 10 μL of additional PBS was injected as a negative control. The change of amplitude upon buffer introduction is within the noise level. 10 μL of 0.42 μg/mL anti-BSA was injected into the well resulting in an anti-BSA concentration of 0.2 nM. The isoelectric point (pI) of BSA is around 5, so the BSA coated fiber is negatively charged in PBS buffer. Anti-BSA with pI between 4.8 and 5.2 is also negatively charged in PBS buffer. This is consistent with the CSOD result in discussed with respect to FIGS. 5A-5H, which showed gradually increased oscillation amplitude upon anti-BSA binding to BSA, and eventually reached a stable state after the binding reached equilibrium. The result is comparable with that obtained in 40 times diluted PBS.

To demonstrate small molecule detection capability in normal buffer with CSOD technology, binding kinetics were assessed between small molecule ligands and membrane protein displayed on virion surface (VirD) in 1×PBS. Specifically, HSV-1 virion displayed G-protein coupled receptor (GPCR) ADRB2 and GPR55 were used. The VirD technology provides a native-like microenvironment for GPCR, but the virion has a large mass (~200 MDa), and thus, the relative mass change caused by binding of a small molecule ligand (<1 kDa) is very small, with about 1000 copies of GPCR per virion coverage on average. The mass change assuming complete binding is less than 0.5%, which is a challenge for mass sensitive technologies.

Figure 6A:
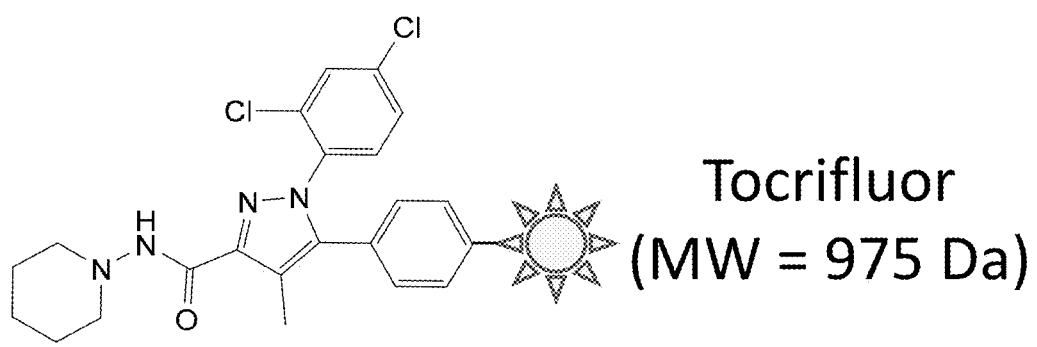
FIG. 6A depicts the structure of B2 antagonist and Tocrifluor with fluorescent tags.
Figure 6A:
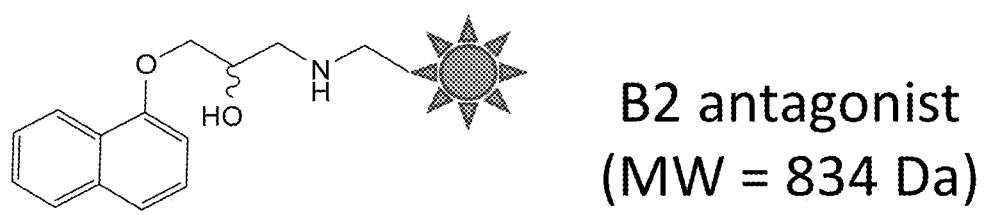
Figure 6B:
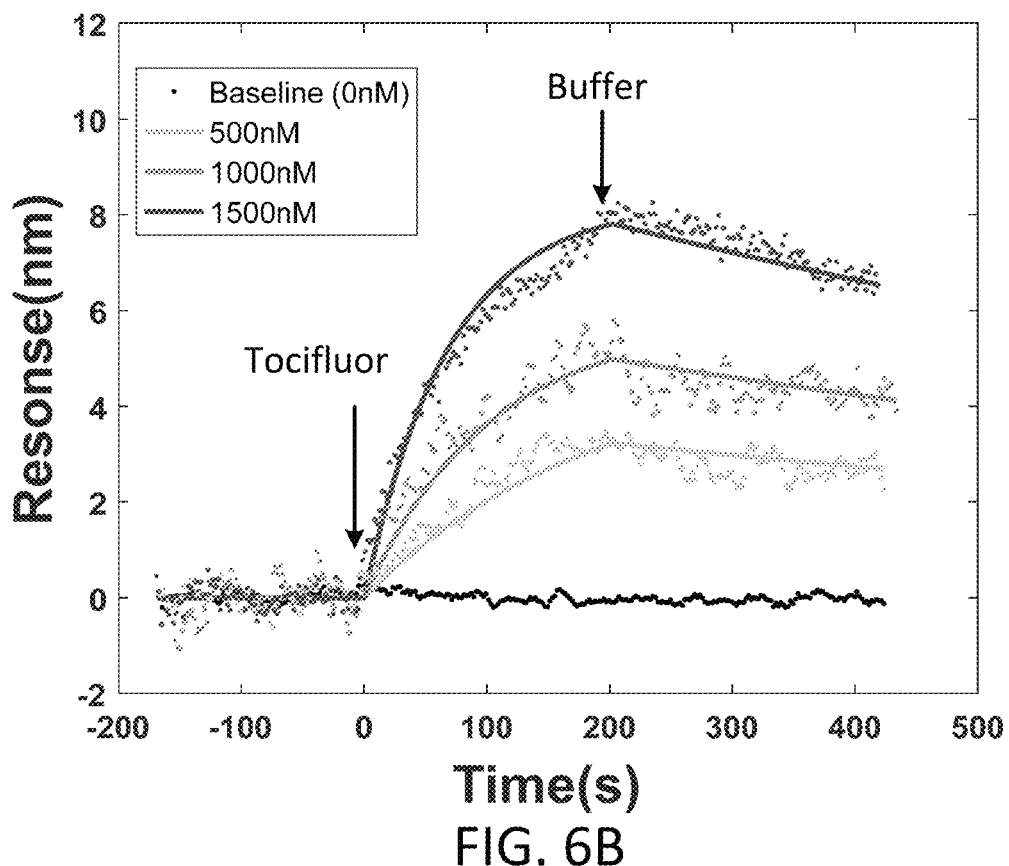
FIG. 6B shows CSOD measurements of GPR55-Tocrifluor binding kinetics.
Figure 6C:
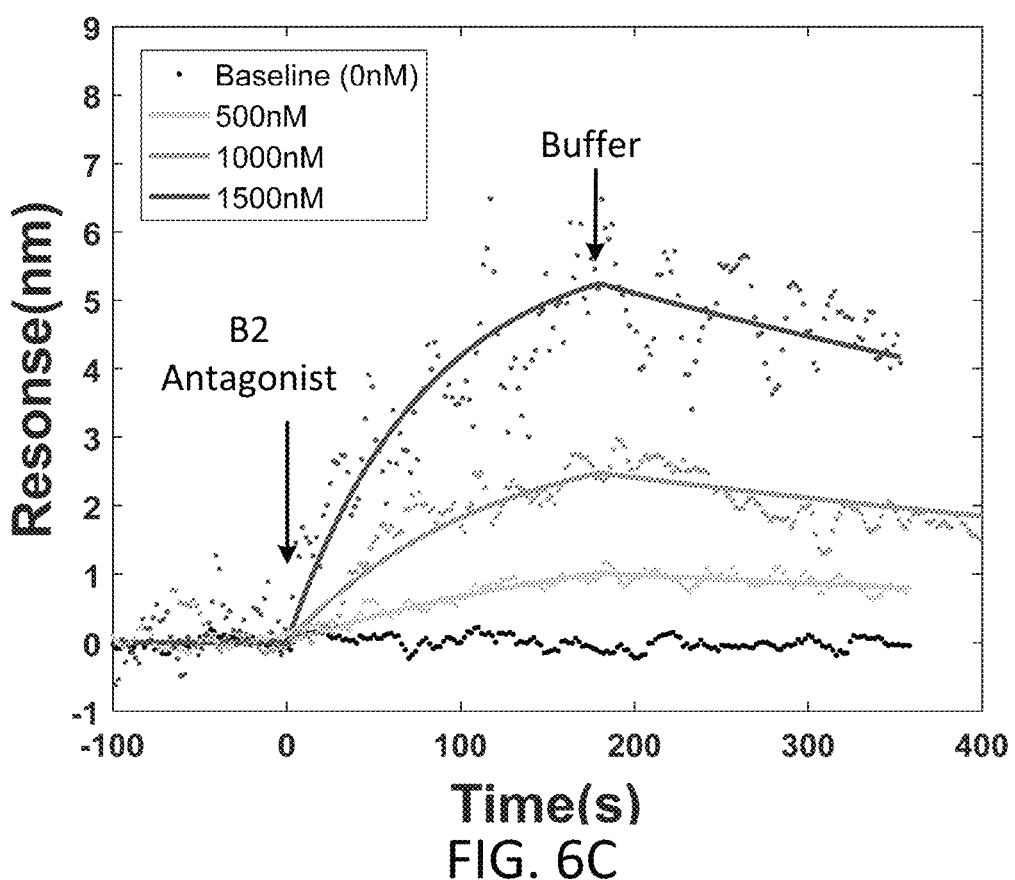
FIG. 6C shows CSOD measurements of ADRB2-B2 antagonist binding kinetics.
Figure 6D:
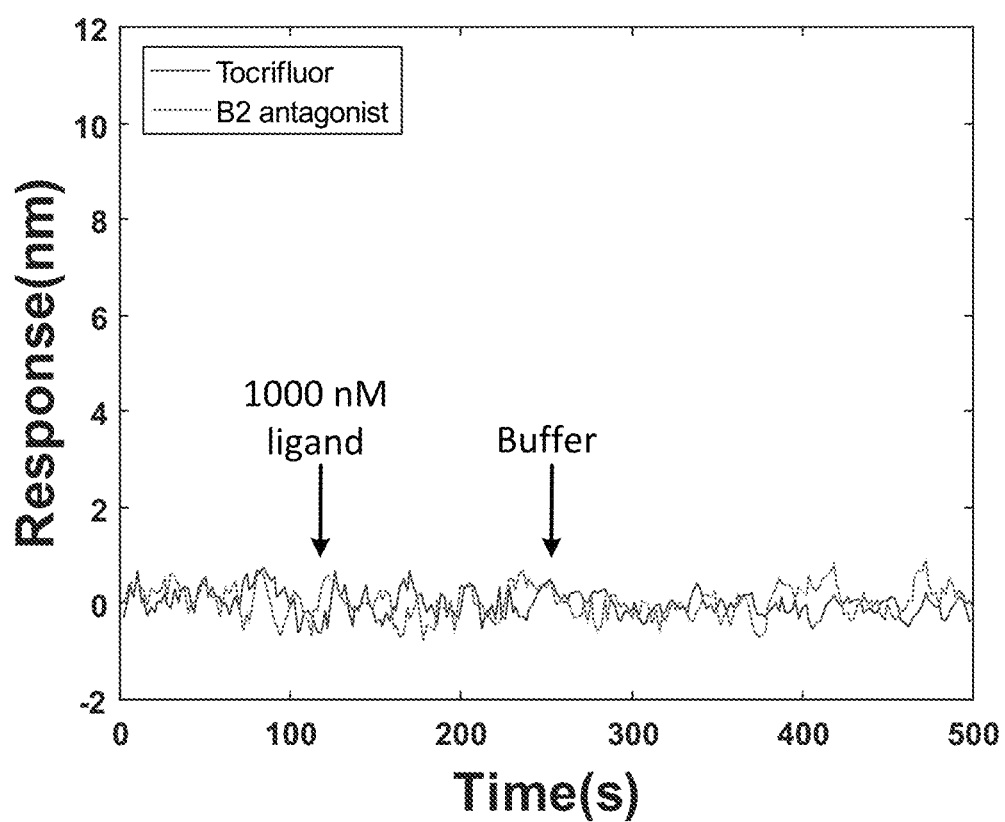
FIG. 6D shows results from a negative control experiment with K082 modified fiber.

Virions are functionalized to fiber surface via epoxy coupling, and the binding of respective small molecule antagonists B2 antagonist and Tocrifluor are studied in 1×PBS. The structures of the fluorescent tagged molecules are shown in FIG. 6A. First, the virions modified fiber tip was dipped into one well filled with 1×PBS buffer to establish a baseline. Subsequently, the fiber tip was switched from the buffer well to a sample well containing ligands to measure the binding or association process. At last, the fiber tip was switched back to the buffer well for dissociation studies. FIG. 6B shows the kinetic curves for GPR55 virions binding to three concentrations of Tocrifluor and a baseline with no Tocrifluor added. Solid lines are global fitting of the data with a first-order kinetic model. FIG. 6C shows the kinetic curves of B2 antagonist binding to ADRB2 virions and the corresponding global fitting curves. For both binding pairs, when no ligand is introduced, the baseline level is within the noise level, showing that the oscillation amplitude change was caused by the specific binding between the ligands and their corresponding receptors. The specificity was further confirmed by including an empty virion, K082 as negative control, which does not have any GPCR displayed. As shown in FIG. 6D, K082 binds to neither B2 antagonist nor Tocrifluor.

By fitting the kinetic curves at different concentrations globally with first-order kinetics, the association rate constant ($k_a$), dissociation rate constant ($k_d$) as well as equilibrium constant ($K_D$) for both binding pairs are calculated.

For Tocrifluor binding to GPR55 receptor, the kinetic constants determined from global fitting were $k_a$=9.2×

$10^3 M^{-1} \cdot s^{-1}$, $k_d=8.1\times10^{-4}$ $s^{-1}$, $K_D=89$ nM [residual standard deviation (res SD)=0.3]. For B2 antagonist binding to ADRB2 receptor, $k_a=7.5\times10^3 M^{-1}$ $s^{-1}$, $k_d=1.4\times10^{-3}$ $s^{-1}$, $K_D=189$ nM (res SD=0.4).

Figure 6E:
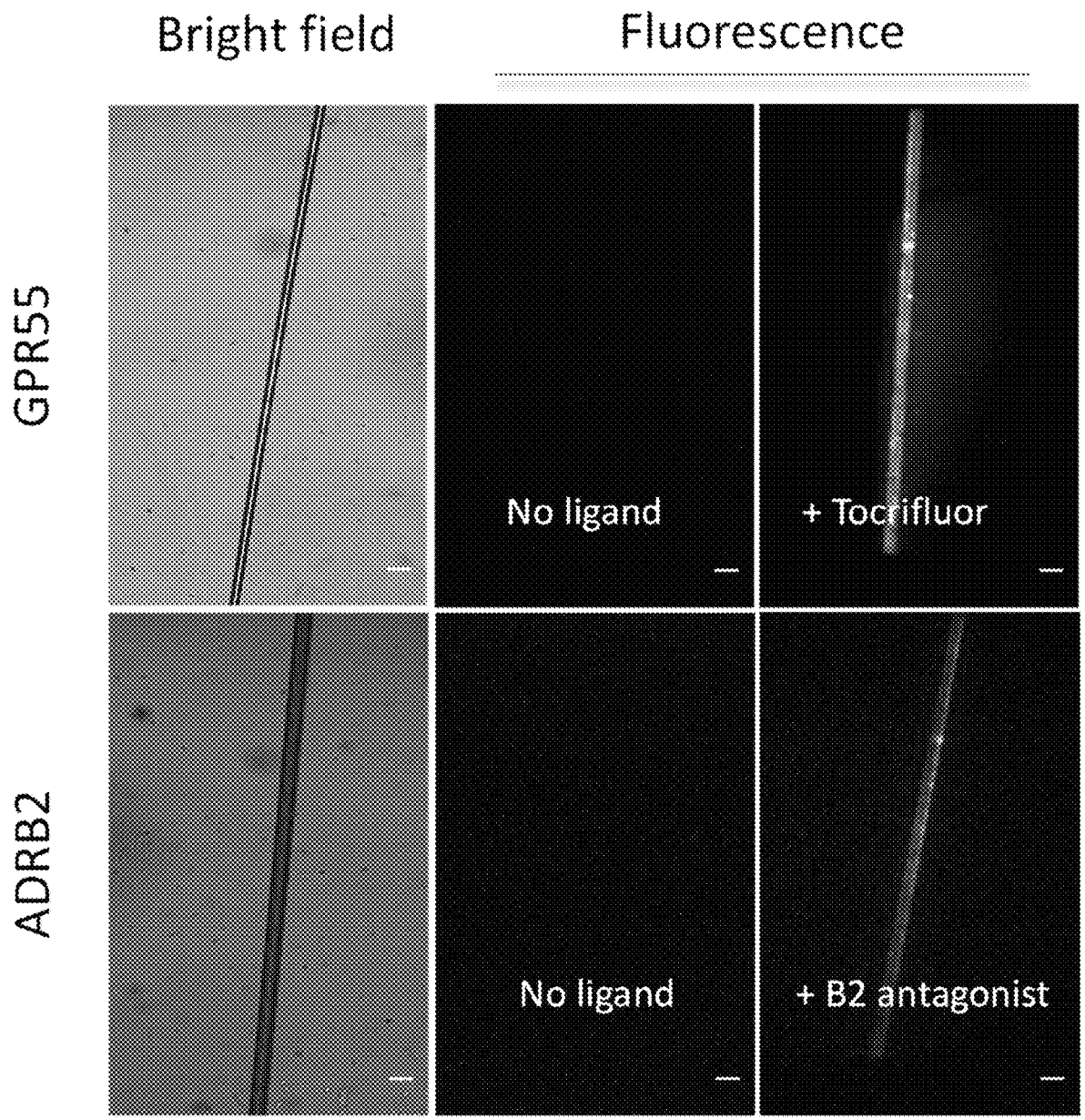
FIG. 6E shows bright field and fluorescent images of virions modified fibers and small molecule associated fibers.
Figure 6F:
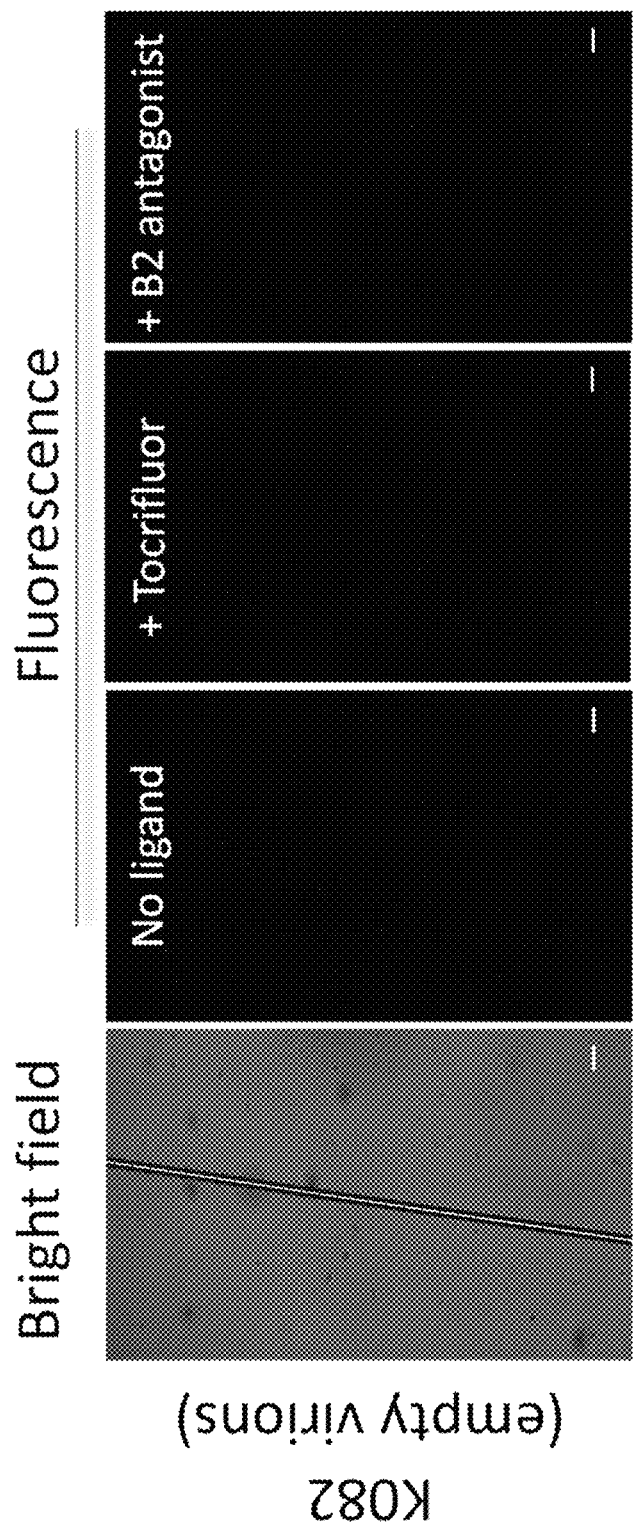
FIG. 6F shows bright field and fluorescent images of negative control virions K082.
Figures 6G, 6H:
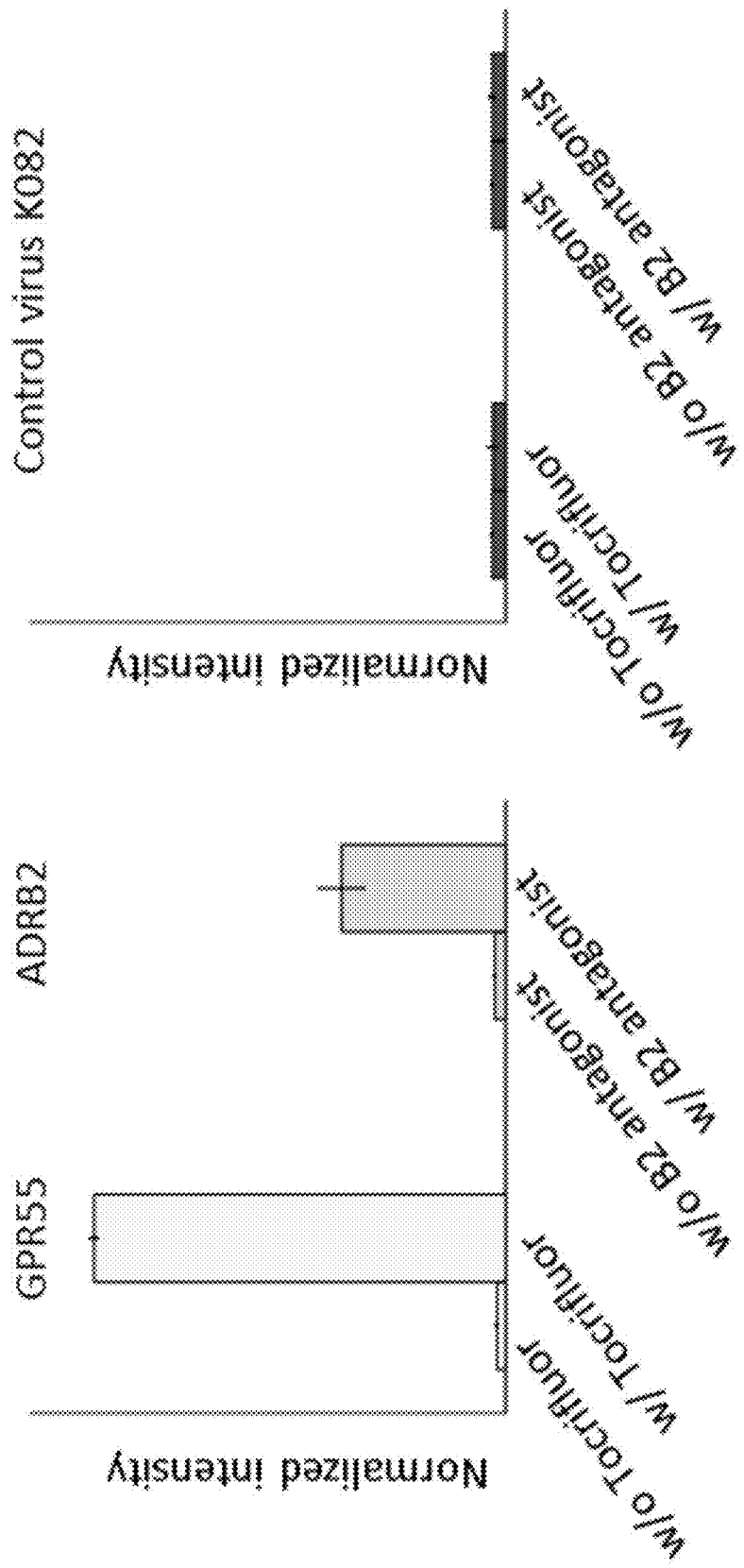
FIG. 6G shows normalized fluorescent intensities of GPR55 and ADRB2 modified fibers compared with Tocrifluor and B2 associated fibers.
FIG. 6H shows normalized fluorescence intensities of K082 modified fibers compared with ligands introduced intensities.

Fluorescence imaging was used to cross validate the binding events, since the small molecules are tagged with a fluorescence dye. For each binding pair studied, after kinetics studies, the fiber tips were then soaked in ligand solution again to allow association of the fluorescent tagged ligands, after which the fluorescent images were taken. FIG. 6F shows the bright field image of GPR55 and ADRB2 modified fibers, the fluorescent images of the modified fibers, and the fluorescent images of fibers after their corresponding ligands are introduced. The normalized fluorescent intensities of the fibers are plotted in FIG. 6G. FIG. 6E shows the bright field image of negative control, empty VirD K082 modified fiber, the fluorescent image of the modified fiber, and the fluorescent images of the fiber after ligands are introduced. Normalized fluorescent intensities are also plotted as shown in FIG. 6H. These results show the specific binding between the two ligand and receptor pairs.

Figure 7:
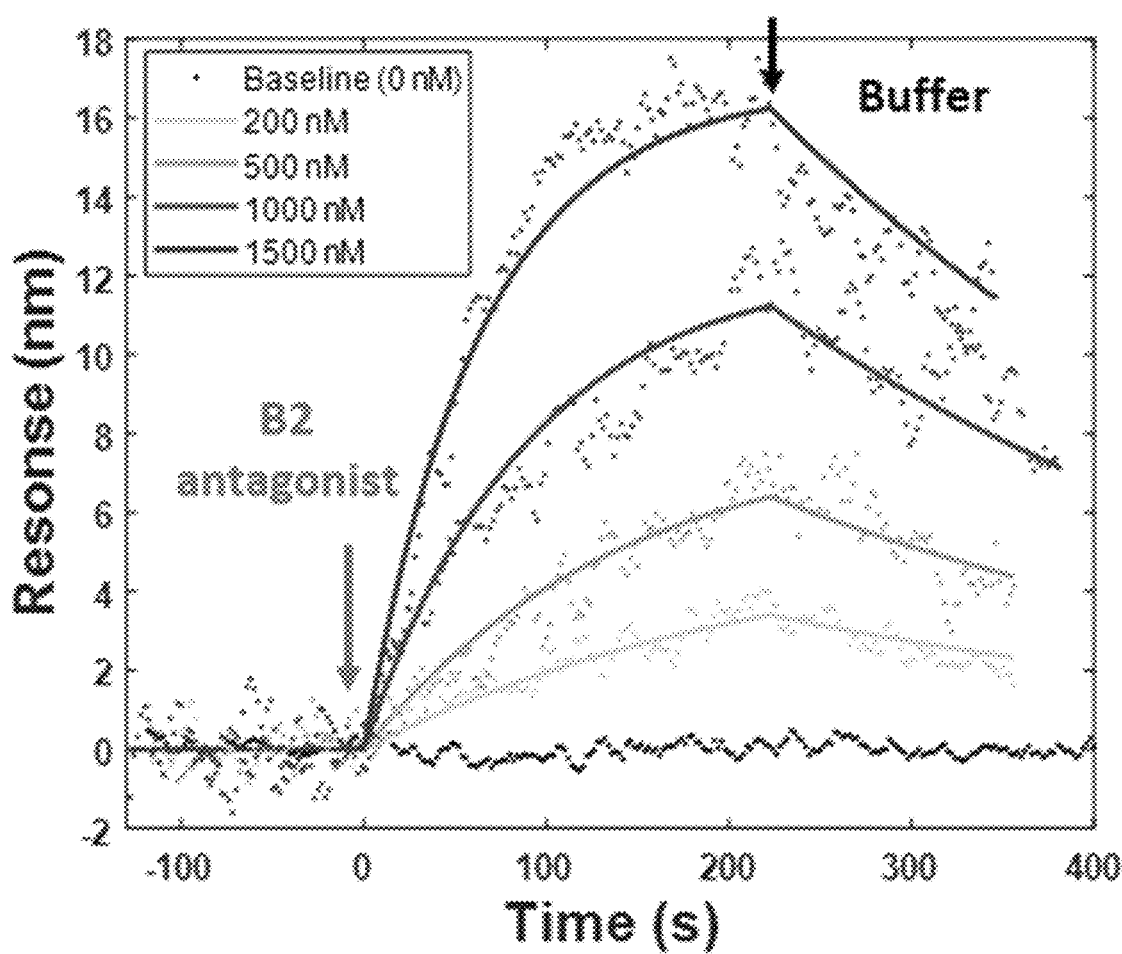
FIG. 7 shows CSOD measurements of ADRB2-B2 antagonist binding kinetics.

To study the impact of buffer ionic strength on the binding kinetics, the binding results in 1×PBS were compared with results measured in a more diluted buffer solution (40 times diluted 1×PBS) for the same experiments performed with ADRB2-B2 antagonist pair. The solid lines in FIG. 7 show the global fitting of the data with first-order kinetic model. Kinetic constants given by global fitting were $k_a=8.4\times 10^3 M^{-1}\cdot s^{-1}$, $k_d=2.8\times10^{-3}$ $s^{-1}$, $K_D=337$ nM (res SD=0.6). This $K_D$ value is higher than the value measured in 1×PBS buffer (189 nM). Similarly, for Tocrifluor/GPR55 pair, the $K_D$ measured in diluted buffer by VirD oscillator method was 160±50 nM, also nearly double than CSOD measured value in 1×PBS (89 nM). Both of the GPCR binding pairs measured involve electrostatic interactions, since the reported binding site of GPR55 is hydrophilic, and ADRB2 is partially hydrophilic. Thus, the affinity measured under normal and diluted PBS are different. Results confirm that buffer ionic strength does have an impact to the binding kinetics, and therefore, the charge-based detection in normal buffer allowed accurate and unbiased measurement of molecular binding kinetics. Due at least in part to the strong ionic screening effect in normal ionic strength buffer, the signal intensity is reduced to about half of the measurement in low ionic strength buffer while the noise remains at a similar level.

Figure 8A:
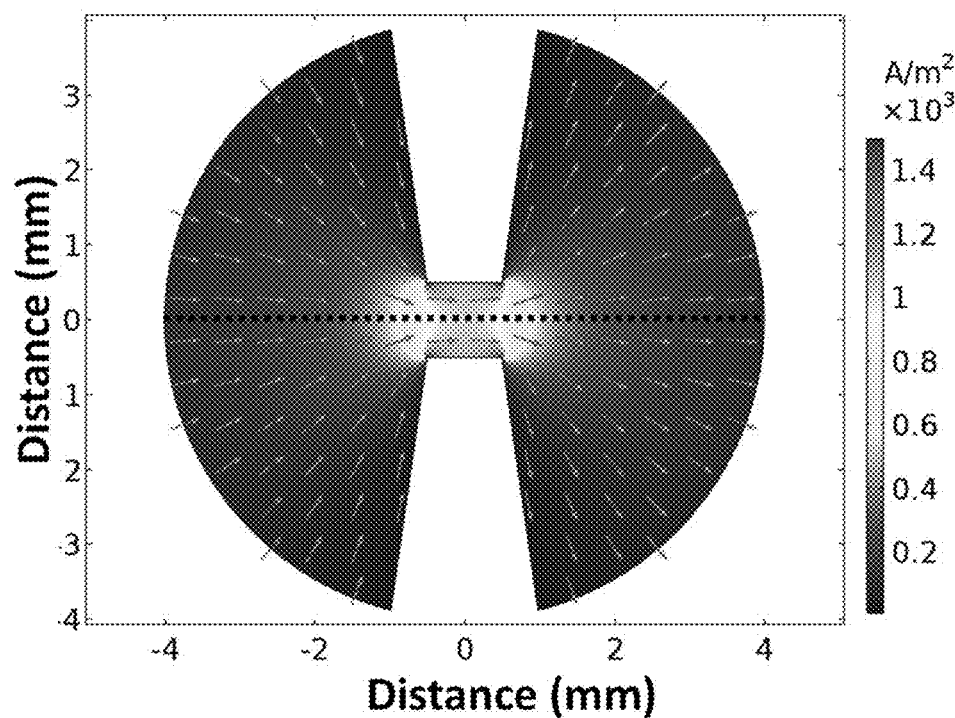
FIG. 8A shows current density distribution in a cutaway circular shape well.
Figure 8B:
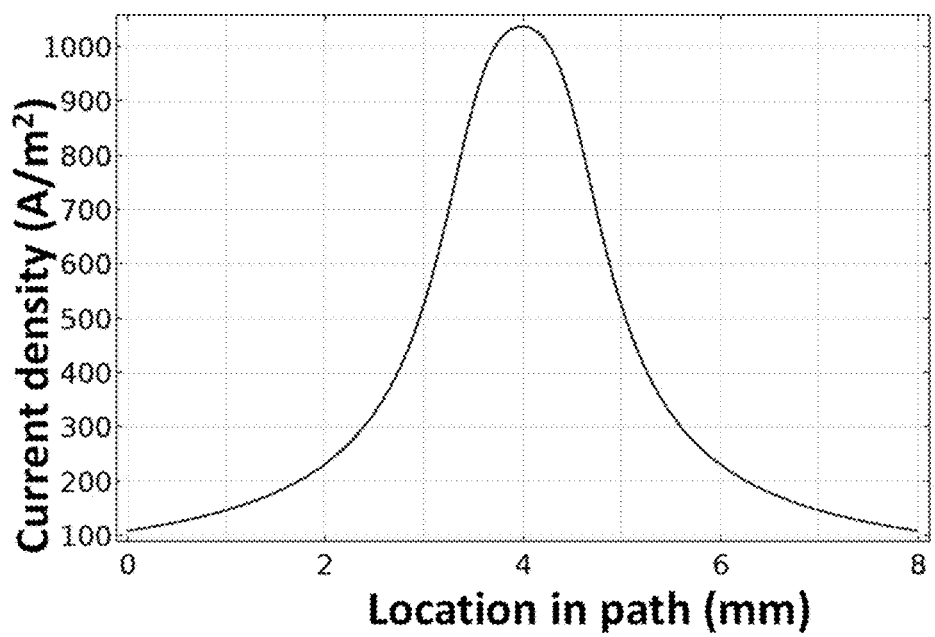
FIG. 8B shows a current density plot along the center dashed line in FIG. 8A.

The signal intensity can be improved by optimizing the well geometry, so that higher field can be applied without introducing excessive electrode reactions. FIGS. 8A and 8B show simulation results of a well design 800 with fan shape or cutaway circular geometry that further increases the ratio of current density between the sensing area and electrodes to approximately 10, which is 5 times higher than the H-shaped well used in the current setup. Since the signal scales with current density, while the noise remains flat as long as the electrode reaction is under control, a 5 fold improvement in signal to noise ratio is expected from this design.

Figure 9A:
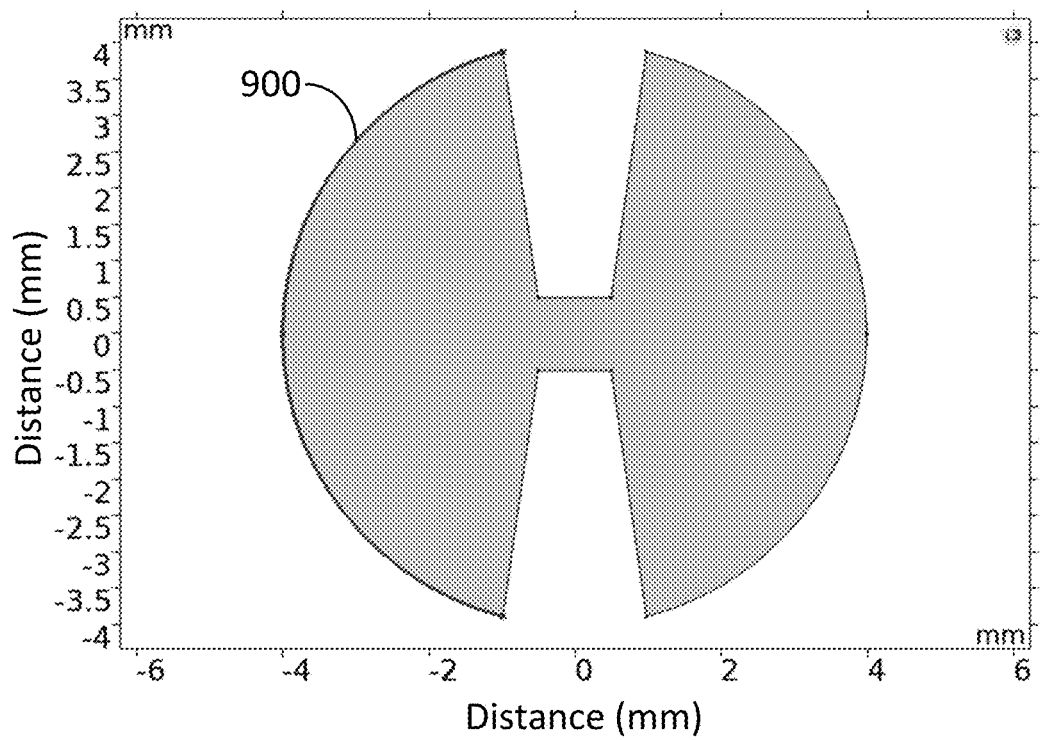
FIG. 9A shows a cross section of the cutaway circular shape well shown in FIG. 8A).
Figure 9B:
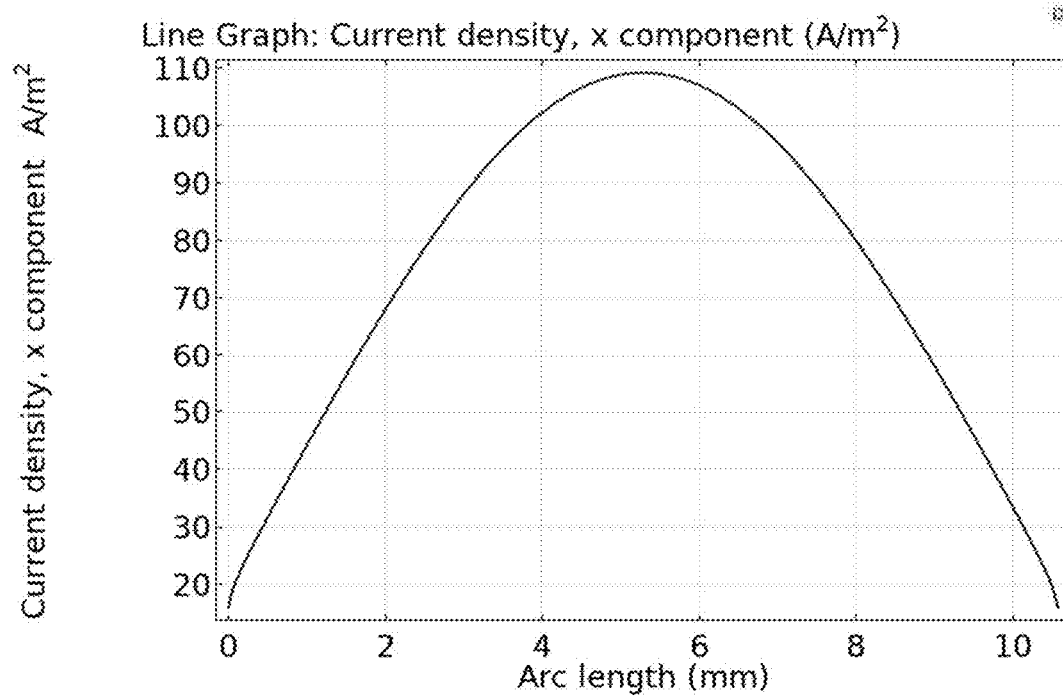
FIG. 9B shows current density on the electrode of the circular shape well plotted along edge 900 of the cutaway circular shape well in FIG. 9A.
Figure 9C:
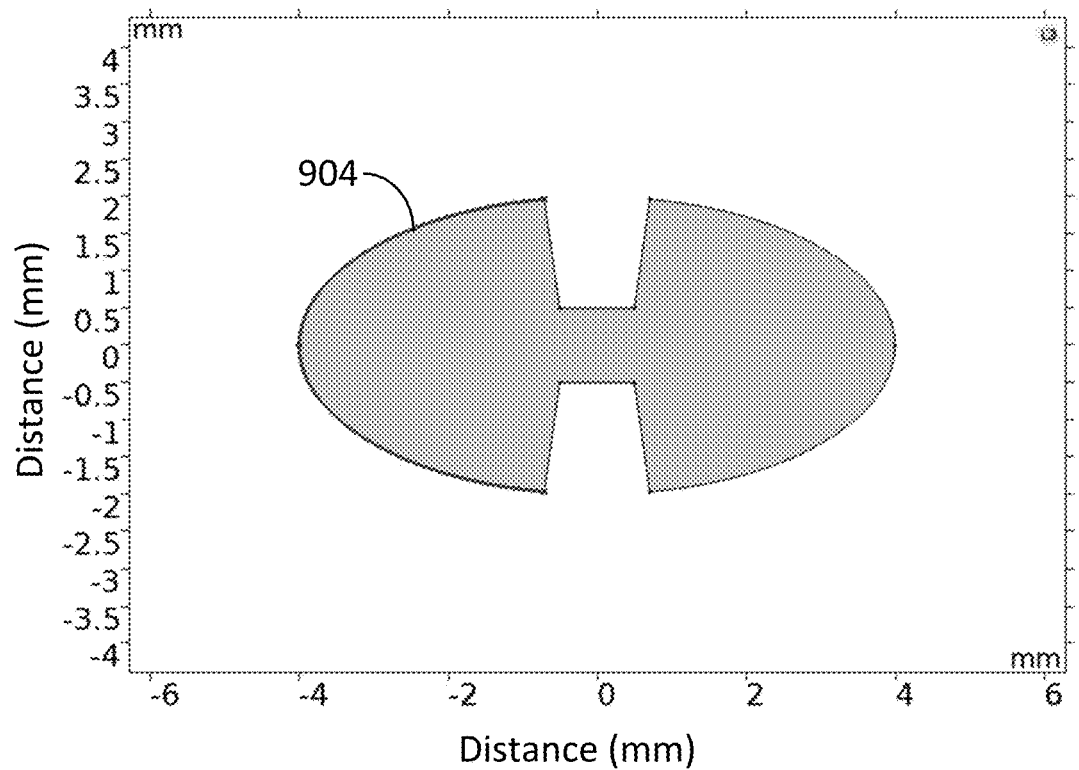
FIG. 9C shows a cutaway oval shape well.
Figure 9D:
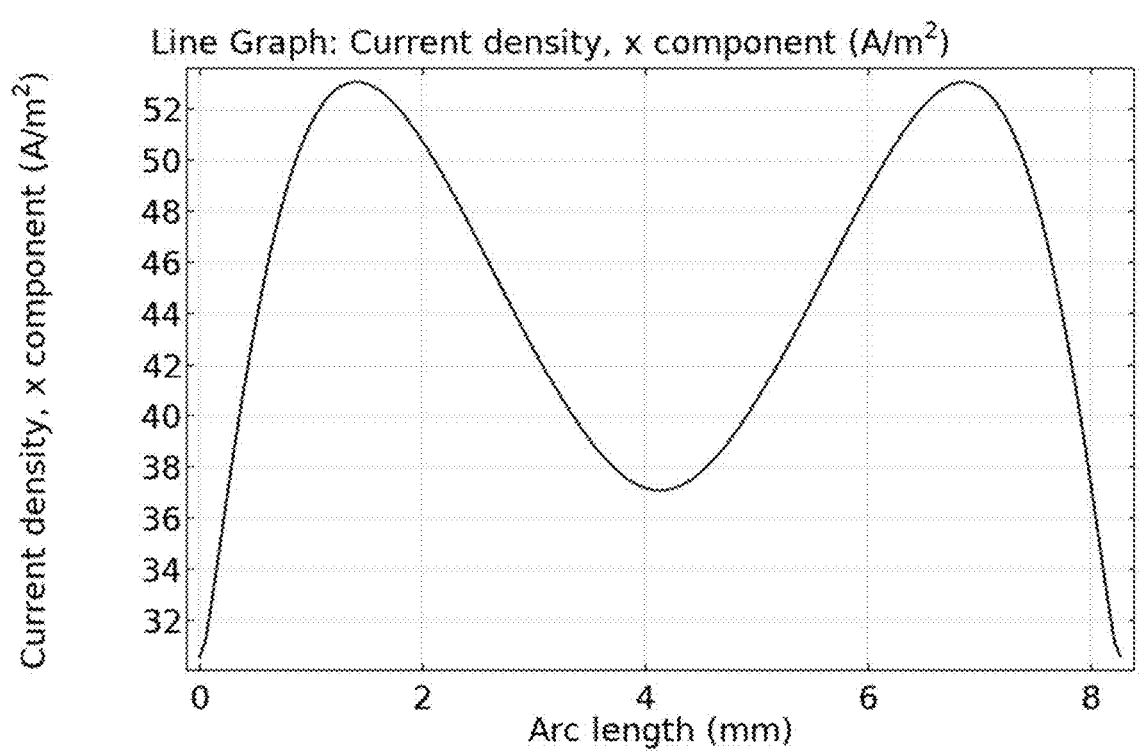
FIG. 9D shows current density on the electrode of the cutaway oval shape well plotted along edge 904 of the cutaway oval shape in FIG. 9C, where the maximum current density on electrode (53 A/m$^2$) dropped to less than half of the cut away circular shape well (110 A/m$^2$).

The circular geometry can be further optimized as the distribution of current density along the electrode (FIG. 9A) is not even and has a maximum electrode current density of 110 A/m² at the center location (FIG. 9B). By stretching the circular shape to an oval shape (FIG. 9C), the simulation shows that the maximum current density on the electrode can be reduced to 53 A/m² (FIG. 9D), less than half of the value in the circular shape well while the total current kept the same. This means that the ratio of current density between the sensing area and the electrodes can be increased another fold using this oval shape well. In addition, fine tuning the shape of the well, and/or further reduce the size of sensing area can further improve the current ratio, the maximum current density at the sensing area, and the signal to noise ratio.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A system for detecting target molecules in a sample, the system comprising:
    a sample well defining a sensing region and two electrode regions;
    a sensor positioned in the sensing region and sensitized to the target molecules, wherein the sensor comprises a filament that comprises an optical fiber;
    an electrode positioned in each electrode region and configured to expose the sensor to a frequency-modulated electric field, wherein the sensing region defines a channel between the electrodes;
    two pieces of electrophoresis gel positioned in the sample well separately in front of each electrode that cover the electrodes, wherein the two pieces of electrophoresis gel are configured to prevent electrode reaction generated bubbles from entering the sensing region, to maintain solution conductivity, and to reduce a liquid surface area in the sample well; and
    a detector that is configured to detect an amplitude of oscillation of the sensor at a frequency of the frequency-modulated electric field and a direction of a displacement of the sensor;
    wherein a ratio of a current density at a center of the sensing region to a current density at one of the electrodes is at least 2;
    wherein a cross section of the sample well perpendicular to a longitudinal axis of the optical fiber has an "H" shape;

wherein a center area of the sensing region of the "H" shape sample well comprises a tunnel filled with a solution that connects the two pieces of electrophoresis gel and the electrodes to one another, wherein the sensor is positioned in the center area of the sensing region of the "H" shape sample well, wherein the two pieces of electrophoresis gel are positioned on either side of the center area of the sensing region of the "H" shape sample well, and wherein the center area of the sensing region of the "H" shape sample well has a higher current density than areas of the "H" shape sample well that comprise the two pieces of electrophoresis gel when the frequency-modulated electric field is applied perpendicular to the longitudinal axis of the optical fiber; and wherein each of the electrodes comprises a planar shape and each of the electrodes comprises width and height dimensions such that each of the electrodes completely covers a respective side of the "H" shape sample well with the sensing region of the "H" shape sample well disposed between the electrodes.

2. The system of claim 1, wherein the center area of the sensing region of the "H" shape sample well defines the sensing region.

3. The system of claim 2, wherein the sensing region is configured to contain the solution, wherein the solution comprises the target molecules.

4. The system of claim 1, wherein the optical fiber is configured to interact with amine groups, carboxy groups, or streptavidin or biotinylated molecules.

5. The system of claim 4, wherein the optical fiber is coated with a silane-containing compound.

6. The system of claim 1, wherein the target molecules are electrically charged.

7. The system of claim 6, wherein the target molecules are proteins or virions.

8. The system of claim 1, wherein the detector is an optical imager or a photodetector.

9. The system of claim 8, wherein the detector is a position sensitive photodetector.

10. The system of claim 1, wherein the sample well comprises a buffer having an ionic strength of 10 mM to 1 M and wherein the "H" shape increases the current density in the sensing region.

* * * * *